COIN TELEPHONE CONTROL CIRCUIT
Filed May 11, 1965
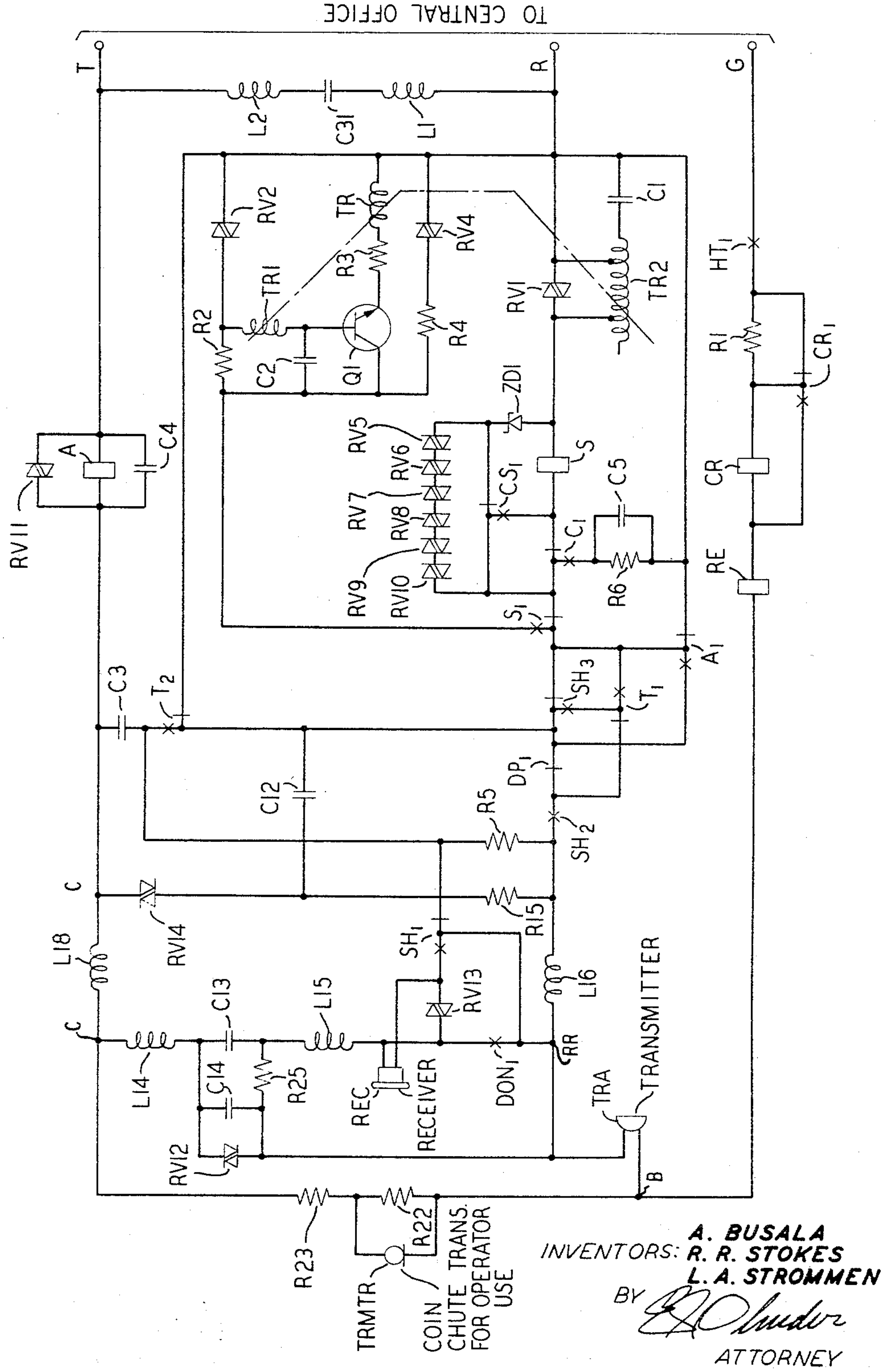
INVENTORS: A. BUSALA
R. R. STOKES
L. A. STROMMEN
BY [signature]
ATTORNEY 3,435,146

COIN TELEPHONE CONTROL CIRCUIT

Alessandro Busala, Rembert R. Stokes and Lawrence A. Strommen, Indianapolis, Ind., assignors to Bell Telephone Laboratories, Incorporated, New York, N.Y., a corporation of New York Filed May 11, 1965, Ser. No. 454,889
Int. Cl. H04m 17/02
U.S. Cl. 179—6.3 7 Claims

ABSTRACT OF THE DISCLOSURE

In the control circuit for a coin operated telephone the contacts of a relay in the tip lead are employed to eliminate coin signal simulated transients and an equalizing network is employed in combination with the coin signal oscillator so that the output voltage seen at the operator's position is compensated according to loop length.

This invention relates to coin operated telephones and more particularly to the control apparatus employed in such instruments. Its general object is to enhance the reliability of coin telephone control arrangements.

Modern coin telephone control arrangements, as disclosed for example by E. R. Andregg and K. E. Voyles in a copending application Ser. No. 224,303 filed Sept. 18, 1962, now Patent No. 3,239,609, broadly include two principal elements, namely, a totalizer mechanism and associated control circuitry. Key contacts or switches in the control circuitry are operated by cams carried by a rotatable shaft in the totalizer mechanism. In response to the deposit of a coin, the shaft rotates in a forward direction through an angle indicative of the value of the coin. Rotation of the shaft through an angle indicative of the deposit of a coin or coins having a total value equal to some preselected rate rotates a rate setting cam to the point at which the cam operates contacts to open a shorting path around the telephone dial pulse contacts, thus readying the dial for operation. In effect, the totalizer shaft stores coin deposit information as it rotates. The reading out of the stored information is accomplished by resetting the shaft in the reverse direction to its normal or index position. The resetting function is performed by a stepping motor which is arranged to drive a ratchet wheel mounted on the totalizer shaft.

Despite the advances and improvements over current commercial installations that are provided by control arrangements of the Andregg-Voyles types, a number of problems remain to be solved. For example, the reliability of coin signal information is adversely affected by interference from switching transients that closely approximate genuine coin signals. Additionally, although the utilization of solid state devices to perform the various control circuit logic functions has obvious advantages, some concern exists for the relatively high circuit cost and complexity when compared to current commercial arrangements. There is also some concern for the reduced reliability that occurs with high temperatures. Further, attempts made heretofore to modify coin telephone control circuitry to eliminate interference with coin signals by switching transients have resulted in unacceptable instability in the operation of the solid state logic circuitry.

Accordingly, a specific object of the invention is to eliminate interference with genuine coin signals by spurious signals caused by switching transients without sacrificing stability of operation in the control circuitry.

Another object is to reduce the cost and complexity of coin telephone control circuits.

A further object is to reduce the effect of temperature as a reliability factor in coin telephone control circuits.

These and other objects are achieved in accordance with the principles of the invention by a coin telephone control circuit that utilizes a single relay on one side of the telephone line connection in lieu of a multiple transistor network to detect current flow and to initiate and control certain logic functions. Additionally, circuit means are provided, in accordance with the invention, for avoiding the interference effects of circuit transients and for equalizing signal oscillator outputs to the end that the effect of loop length on signal amplitude is markedly reduced.

One aspect of the invention involves the particular means employed in suppressing or eliminating switching transients. In the prior art, such transients have resulted from sharp discontinuities in current flow that occur in the ring lead. These are avoided in part by employing a suitable magnitude of capacitance to bypass the D-C portion of the impedance of both the stepping coil and the oscillator coil which are disposed in series in the ring lead. In accordance with the invention, further suppression of transients is provided by maintaining a constant level of current across the telephone speech network during the shorting out of the telephone set that takes place upon the generation and transmission of coin signals. Maintenance of a substantially constant current level is achieved in accordance with the invention by interposing a capacitor in the otherwise direct connection between the ring and tip sides of the line, which connection is completed by the closing of one of the totalizer-operated contacts. Additionally, a resistive path is provided from the ring terminal of the speech network to a point common to one side of the indicated totalizer-operated contact and one terminal of the connecting capacitor. The resistive path serves to maintain a charge on the capacitor equal to the voltage across the terminals of the speech network irrespective of the condition of the totalizer contact. It is this maintenance of voltage equality that, coupled with the elimination of current surges in the ring lead, ensures a reduction in the level of transients to the end that such transients no longer are of sufficient magnitude to create interference with legitimate coin signals.

Other objects of the invention are achieved by uniquely incorporating an equalizer network as a part of the coin signal oscillator circuit, which network ensures a substantially constant coin signal level irrespective of loop length.

Accordingly, one feature of the invention is the utilization of a single relay in series with the tip lead of a telephone coin control circuit to detect current flow in that lead, thereby to supplement the coin totalizer as a logic control means.

Another feature relates to the elimination of current surges in the ring lead of a telephone coin control circuit, thereby to reduce transients that otherwise interfere with legitimate coin signals.

A further feature pertains to the maintenance of a substantially fixed voltage level across the speech network of a coin telephone irrespective of whether the network is shorted out during the generation and transmission of coin signals, thereby to reduce transients that otherwise interfere with legitimate coin signals.

An additional feature involves a transistor oscillator for the generation of coin identifying tone signals in a coin telephone control circuit, the oscillator having an integral equalizing circuit to ensure a relatively constant signal magnitude irrespective of loop lengths.

The principles of the invention and additional objects and features thereof will be fully apprehended from the following detailed description of an illustrative embodiment of the invention and from the drawing in which the single figure is a schematic circuit diagram of a telephone coin control circuit in accordance with the invention.

The circuitry shown in the single figure employs conventional detached contact notation in which an "X" denotes a make or normally open contact and a bar "—" indicates a break or normally closed contact. Certain of the contacts such as $C_1$, $CS_1$, $T_1$ and $T_2$ are operated by corresponding cams on a totalizer mechanism. Although the totalizer mechanism is not shown herein, such mechanisms are well known in the art and are shown and described in detail in the application of E. R. Andregg-K. E. Voyles, Ser. No. 224,303, filed Sept. 18, 1962. A totalizer mechanism is also shown in Patent 3,146,312 issued Aug. 25, 1964 to E. R. Andregg and L. A. Strommen.

The circuit shown in the figure may be described broadly in terms of subcircuits which include an oscillator circuit, a coin identification signal speed control circuit, a telephone speech network, an operating control and logic circuit and a coin relay and reset relay circuit. The oscillator circuit, which is utilized to generate tone pulse coin identification signals, employs a transistor Q1 with conventional emitter-to-base coupling provided by transformer coils TR and TR1. Other circuit elements included in the oscillator circuit are the varistors RV2 and RV4, resistors R2, R3 and R4 and capacitor C2.

The coin identification signal speed control circuit includes the coil of a stepping motor S which is in series with ring lead R. The rate at which stepping motor S operates is determined by the reference voltage across it which, in turn, is established by the magnitude of a shunting impedance. For low speed action, employed to signal the deposit of a nickel or a dime, the impedance shunting stepping motor S results from the voltage limiting characteristic of Zener diode ZD1, the varistors RV5 through RV10 being shunted by a path that includes normally closed contacts $CS_1$. With the deposit of a quarter, however, transfer contacts $CS_1$ operate which opens the shunt path across varistors RV5 through RV10. The resulting high impedance across stepping motor S raises the voltage across it which in turn increases the stepping rate and hence the signaling rate. Transistor oscillator Q1 is caused to oscillate by the operation of stepping coil break contact $S_1$, which action diverts current in the ring lead to the oscillator circuit.

The telephone speech network is coupled to ring lead R by inductor L16 at terminal RR and to tip lead T by inductor L18 at terminal C. The speech network is wholly conventional and is included herein merely to ensure disclosure of a complete embodiment of the invention. The upper terminal of transmitter TRA connects to ring lead R via inductor L16, and the lower terminal of transmitter TRA connects to terminal B and is extended to tip lead T through resistors R22, R23, and inductor L18. Receiver REC is similarly bridged between ring lead R and tip lead T through switchhook make contact $SH_1$ and inductor L16 or, alternatively, through off normal make contact $DON_1$ and inductor L16. A conducting path from the lower terminal of receiver REC to tip lead T is provided through multiple paths that include inductor L15, capacitors C13 and C14, resistor R25, varistor RV12 and inductors L14 and L18.

The coin relay circuit provides a means for applying ground to the telephone speech network and hence also to the logic circuit. The grounding path extends through hopper trigger make contact $HT_1$, resistor R1, shunted by break contact $CR_1$, and the coil of coin relay CR shunted by make contact $CR_1$. Resistor $R_1$ is inserted into the line by the operation of coin relay transfer contacts $CR_1$ in order to limit current flow from the central office when coin relay CR is operated. The grounding path continues through reset electromagnet RE, which is employed to reset the totalizer, and thence to terminal B of the speech network.

The remainder of the circuitry may be characterized as coin control and logic circuitry, and its interrelation with the circuitry already described, together with its functions, may best be presented in terms of a step-by-step operational circuit description.

*Circuit operation—local call*

In the stand-by condition, that is, with the handset on hook and with no money in the coin telephone hopper, the telephone is ready to provide customer service. At this time, the central office, not shown, monitors the ring-to-ground path with no connection on the tip lead. When the customer removes the handset, switchhook contacts SH1, SH2 and SH3 change state which establishes a path from ring lead R through to hopper trigger contact $HT_1$. $HT_1$ is a normally open contact, however, and hence ground is not extended to ring lead R at this point. The path described extends from ring lead R through break contact $T_2$, break contact $DP_1$ (dial pulse contacts), make contact $SH_2$ to terminal RR and thence to terminal B of the speech network, through reset electromagnet RE, coin relay coil CR and thence to normally open hopper trigger make contact $HT_1$.

The first coin deposited opens break contact $T_2$, which action is described in detail by Andregg and Voyles, cited above. The operation of break contact $T_2$ disconnects ring lead R from the speech network. In accordance with the invention, a capacitor $C_3$ is utilized in series with make contact $T_2$ in order to permit the telephone speech network to remain in the circuit on a D-C basis when the T2 contacts change. With this arrangement, the set is shorted as far as A-C impedance is concerned when coin signals are being transmitted, but it retains the same D-C resistance irrespective of coin signal generation. Accordingly, current level is prevented from changing rapidly and no transient is generated when the speech network is shorted out. In this connection, a critical function is performed, in accordance with the invention, by resistor R5 in that it maintains the charge on capacitor C3 so that the voltage across it remans equal to the D-C voltage between terminals RR and C. To ensure against the development of a voltage across resistor R5 which would produce a different potential across capacitor C3 than from terminal RR to C, it is essential that capacitor C3 be selected with care insofar as its leakage value is concerned. If the leakage value across capacitor C3 is kept at a relatively low level, there will be no substantial IR drop across resistor R5, and the possibility of a voltage surge developing upon the operation of the T2 contacts is virtually eliminated. In prior art arrangements make contact $T_2$ is connected directly across the speech network. Contact $T_2$ thus shorted the network when operated and caused a rapid change in the current level in the ring lead which generated a coin signal interfering transient.

It is to be noted that the utilization of capacitor C3 is incompatible with transistor logic circuitry such as that shown by Andregg and Voyles, cited above, inasmuch as it has been determined that the capacitance renders the transistor circuit somewhat unstable. By utilizing a relay in the tip lead, however, such as relay A, in accordance with the principles of the invention, the key function provided by capacitor C3 may be turned to account, in accordance with the invention, without the risk of circuit instability that would necessarily be present in prior art arrangements.

At the time when ring lead R is disconnected from the speech network by the operation of the T2 contacts, as described above, the alternate path from ring lead R to the speech network provided by break contact $A_1$, make contact $T_1$ and make contact SH3, is open. The first coin also closes hopper trigger contact $HT_1$, regardless of the value of the coin, and the coin is retained in the coin hopper for subsequent collection or refund. If the first coin is equal to or greater than the initial rate, or when the coins deposited add up to the initial rate, a rate control cam on the totalizer (not shown) causes rate control contacts $T_1$ to operate, thereby completing the path from ring-to-ground at the station by way of make contact $T_1$. The normally closed $T_1$ contacts disable the dial until the initial rate has been deposited. Accordingly, a false start at the station does not make service available to the customer until the deposit of the initial rate has been completed.

The central office recognizes the station ring-to-ground connection as a service request, and when switching equipment is available, dial tone is applied to the line and tip lead T is grounded. The ground connection on tip lead T operates relay A at the station. With the operation of transfer contacts $A_1$, the path around the totalizer stepping mechanism, stepping coil S, opens, and the path which includes the $SH_3$ contacts is closed. Under this condition the totalizer steps until the $T_2$ contacts are returned to normal. At this period, the $T_1$ contacts remain in the transfer condition inasmuch as the $T_1$ mechanism of the totalizer is mechanically latched whenever the initial rate is stored in the coin hopper. This action is also shown and described in detail by Andregg and Voyles, cited above.

When the totalizer has been restored to its home or index position, a talking path and dialing path are made available for the customer. When the customer terminates his call, the money stored in the hopper is either refunded or collected. During either of these operations, the reset electromagnet also operates to reset the $T_1$ contacts.

*Incoming calls*

Incoming calls are handled conventionally. A local incoming call operates the ringer shown schematically as inductors L1 and L2 and capacitor C31. Ringing is tripped when the receiver is lifted off hook, and a talking path is established from ring-to-tip through the speech network of the telephone. If the incoming call is a collect call, it is routed through an operator who monitors the coin signals as money is deposited.

*Abandoned call*

If the customer deposits less than the initial rate when originating a call and then abandons, the $T_1$ contact cannot be employed to cause a start. A "false" start is created by a conducting path over normally closed switchhook contact SH3 around the normally open make contact $T_1$. The path starts at ring lead R and proceeds through break contact $A_1$, break contact $SH_3$, make contact $T_2$, which is closed by the deposit of a coin, through normally closed break contact $SH_1$ and thence through multiple paths to the B terminal of the speech network, through reset relay RE, coin relay CR and hopper trigger contact $HT_1$ to ground. The succeeding steps are then the same as described above under the heading Local Call until the totalizer has been read out. At that point the central office observes an open circuit at switching contact $SH_2$ since the $T_2$ contacts have returned to normal. A refund pulse is then applied at the office to clear the telephone for the next customer.

Coin signals

As indicated above, some difficulty has been experienced in prior art arrangements owing to interference with coin signals from a transient signal which occasionally precedes the first "beep" of each coin signal. The transient is caused by a change in D–C current through stepping coil S resulting from the transfer of the $T_2$ contacts and the consequent shorting of the telephone portion of the circuit. Confusion from such transients results in that the deposit of a nickel may at times generate a two-beep signal, a dime a three-beep signal and a quarter a six-beep signal. Normal signals are, instead, one-beep, two-beeps and five-beeps for nickels, dimes and quarters, respectively, with the pulse repetition rate of the quarter signals being substantially higher than the dime signals. If a transient is generated in the manner described, it is evident that a nickel deposit may falsely be interpreted as a dime deposit.

In accordance with the principles of the invention, a capacitor C5 is connected across the stepping coil S and the other circuit elements through which current must flow when break contact $T_2$ opens. Capacitor C5 tends to maintain a short across these elements which gradually opens as the charge on the capacitor builds up. Resistor R6 connected across capacitor C5 discharges it when break contact $C_1$ opens.

Additional details relating to the operation and circuit configuration of the signal oscillator are set forth in the following paragraphs in order to further clarify a particular aspect of the invention. The signal oscillator circuit employing transistor Q1 is excited into oscillation by the energy stored in its tank circuit, comprising capacitor C1 and coil TR2, whenever the current to stepping coil S is interrupted by the operation of normally closed stepping coil contact $S_1$. The output current from the oscillator is applied directly to the line since the frequency control elements are isolated from the line by the collector resistance of the transistor.

In prior art circuits oscillator amplitude control was provided by connecting a Zener type diode across the active oscillator element. The oscillator output was coupled to the line by transformer action. A disadvantage in such an arrangement lies in the fact that the Zener voltage level is constant regardless of loop length, and the impedance of the loop length affects the frequency of oscillation owing to the feedback path between the impedance of the line and the output winding of the oscillator transformer.

In accordance with the invention, however, an equalizing network is connected across the oscillator so that the output voltage is maintained substantially constant irrespective of loop length. Specifically, the equalizing network utilizes a varistor RV4, which may be a silicon carbide type, for example, and a resistor R4. Transistor oscillator Q1 causes a substantially constant current drain on the line. Stated otherwise, the transistor is biased to maintain substantially constant current flow. Accordingly, the compensating network must provide a path for any surplus current in ring lead R inasmuch as there are no other parallel paths. The amount of current in varistor RV4 determines its A–C impedance. It is evident that it is the A–C impedance of varistor RV4, plus the impedance of resistor R4 that make up the compensating network A–C load on the oscillator. This load is in parallel with the load from the line.

On relatively short loops the load from the line is typically at a relatively low level of approximately 900 ohms, for example. The load of the equalizing network is significantly below this value. Thus, the A–C signal generated by the oscillator is attenuated by the compensating network. It is at the lowest level when the A–C impedance is at the lowest value. When connection is made to a long loop, however, current flowing through the transistorized oscillator is still maintained substantially constant, but the current through the compensating network is substantially reduced. With an increased A–C impedance in the compensating network, attenuation of the oscillator output is reduced or, stated otherwise, an equalizing function is performed.

It should be noted that the A–C loss on a telephone loop is almost directly proportional to the D–C resistance irrespective of the gauge of the particular loop. Thus, for example, 26 gauge loop wire has substantially the same A–C loss with a 1000 ohm loop as with a 1000 ohm loop of 19 gauge cable. Consequently, in accordance with the invention, current in the ring lead may accurately be employed as an indicator of the loss on the loop. Owing to system limitations on voltage at the station, there is of course a practical limit on the amount of compensation that can be provided. It is accurate to state, however, that some significant degree of compensation is made even on loops that are substantially in excess of average length.

It is to be understood that the embodiment disclosed herein is merely illustrative of the principles of the invention. Various modifications thereto may be effected by persons skilled in the art without departing from the spirit or scope of the invention.

What is claimed is:

1. Logic control circuitry for a coin telephone including means for generating oscillatory signals indicative of deposited coins comprising, in combination, first and second conductive paths connectable to the tip and ring leads respectively of a telephone line, relay means responsively operative to the flow of current in said first path, means responsive to the operation of said relay means for enabling a coin totalizer, and switch means responsive to the operation of said totalizer for establishing an AC shorting path across the voice circuit of said telephone without changing the DC resistance in said voice circuit, thereby precluding the generation of coin signal simulating transients of sufficient magnitude to interfere with said coin signals.

2. Logic control circuitry for a coin telephone comprising, in combination, first and second conductive paths connectable to the tip and ring leads, respectively, of a telephone line, relay means responsively operative to the flow of current in said first path, means responsive to the operation of said relay means for enabling a coin totalizer, signal generating means responsive to the operation of said totalizer for generating oscillatory signal pulses indicative of deposited coins in terms of both the number and repetition rate of said pulses, and switch means responsive to the operation of said totalizer for establishing an AC shorting path across the voice circuit of said telephone without changing the DC resistance of said voice circuit, thereby precluding the generation of coin signal simulating transients of sufficient magnitude to interfere with said coin signals.

3. Logic control circuitry for a coin operated telephone comprising, in combination, a first pair of terminals each connectable to a corresponding terminal of a telephone line, a second pair of terminals each connectable to a corresponding terminal of the speech network of said telephone, first means including a totalizer stepping coil, a first normally closed totalizer-operated contact, a second normally closed totalizer-operated contact, a first normally closed switchhook-operated contact, a normally closed dial pulse contact and a second normally open switchhook-operated contact, in named order, connecting one of said first pair of terminals to one of said second pair of terminals, a direct conductive path including only a single logic circuit control relay connecting the other of said first pair of terminals to the other of said second pair of terminals, second means connecting said first means from a point common to said first switchhook contact and said dial pulse contacts to said second means at a point common to said relay and said other of said second pair of terminals, said second means including a normally closed totalizer-operated contact and a capacitive element in series relation, conductive means including resistance means connected between a point, common to said last named contact and said capacitive element, and a point on said first connecting means common to said second switchhook contact and said one of said second pair of terminals, and a conductive path shunting said coil and said first switchhook contact, said last named path including a normally closed totalizer-operated contact, whereby transients generated upon the operation of said last named contacts are restricted in magnitude to a level that is insufficient to interfere with genuine coin signals.

4. Coin operated telephone control apparatus comprising, in combination, first means for generating oscillatory signal bursts indicative of the denomination of deposited coins in terms of both the number of bursts and burst repetition rate, means including a totalizer-operated contact for enabling said generating means, switch means responsive to the operation of said totalizer for establishing an AC shorting path across the voice circuit of said telephone without changing the DC resistance of said voice circuit, second circuit means in shunt relation to said first means for reducing the magnitude of signal transients to a level that creates no interference with said signal bursts, and third circuit means in shunt relation to said first means for maintaining the magnitude of said bursts at the associated central office substantially constant irrespective of the length of the connecting telephone loop.

5. Apparatus in accordance with claim 4 wherein said first means includes an oscillator having a transistor active element and wherein said third means includes a varistor and a resistor connected across the emitter and collector terminals of said transistor.

6. Coin telephone control circuitry comprising, in combination, a first pair of terminals each connectable to the corresponding terminal of a telephone line, a second pair of terminals each connectable to the corresponding terminals of a telephone speech network, a plurality of parallel conductive paths connecting one of said terminals of said first pair and one of said terminals of said second pair, a first conductive path including a relay connecting the other of said first pair of terminals to the other of said second pair of terminals, a totalizer-stepping coil being connected in a first one of said plurality of conductive paths, a normally closed contact of said relay being connected in a second one of said plurality of conductive paths, a coin identification signal oscillator and a normally open stepping coil contact being connected in series relation in a third one of said plurality of conductive paths, a normally closed totalizer-operated contact being connected in a fourth one of said conductive paths, and a capactive element shunted by a resistive element being connected in shunt relation to said stepping coil.

7. Apparatus in accordance with claim 6 wherein said oscillator includes a transistor having base, collector and emitter electrodes, and means for equalizing the signals generated by said oscillator irrespective of the loop length of said telephone line, said means comprising a varistor and a resistive circuit element connected in series relation between said emitter and collector electrodes.

References Cited

UNITED STATES PATENTS

| | | | |
|---|---|---|---|
| 3,086,081 | 4/1963 | Cath et al. | 179—6.3 |
| 3,170,039 | 2/1965 | Andregg et al. | 179—6.3 |

WILLIAM C. COOPER, *Primary Examiner.*

J. S. BLACK, *Assistant Examiner.*

U.S. Cl. X.R.

179—6.5